Feb. 14, 1950  S. M. NAMPA ET AL  2,497,683
FREIGHT LOADING APPARATUS
Filed Sept. 25, 1948  6 Sheets-Sheet 2
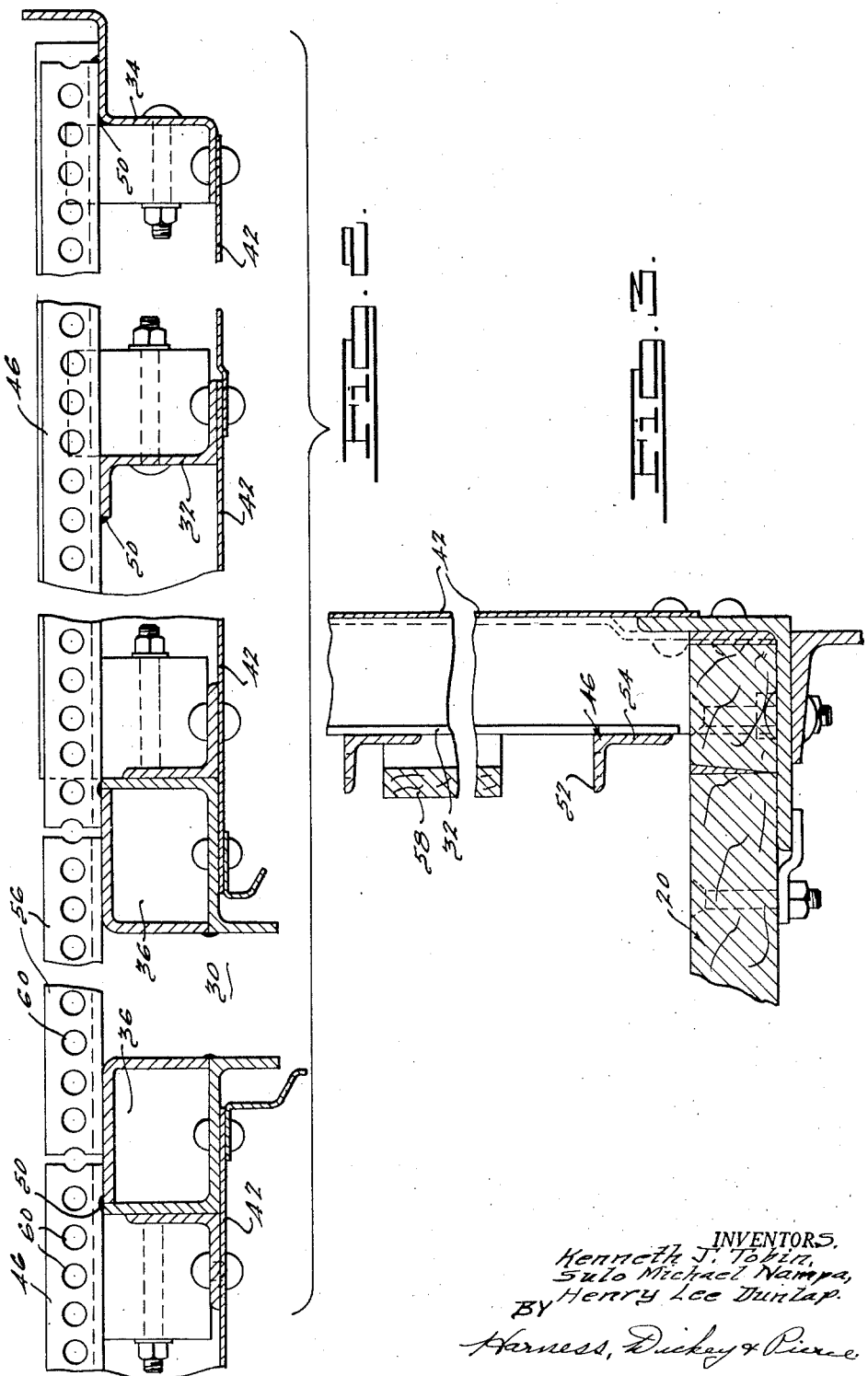

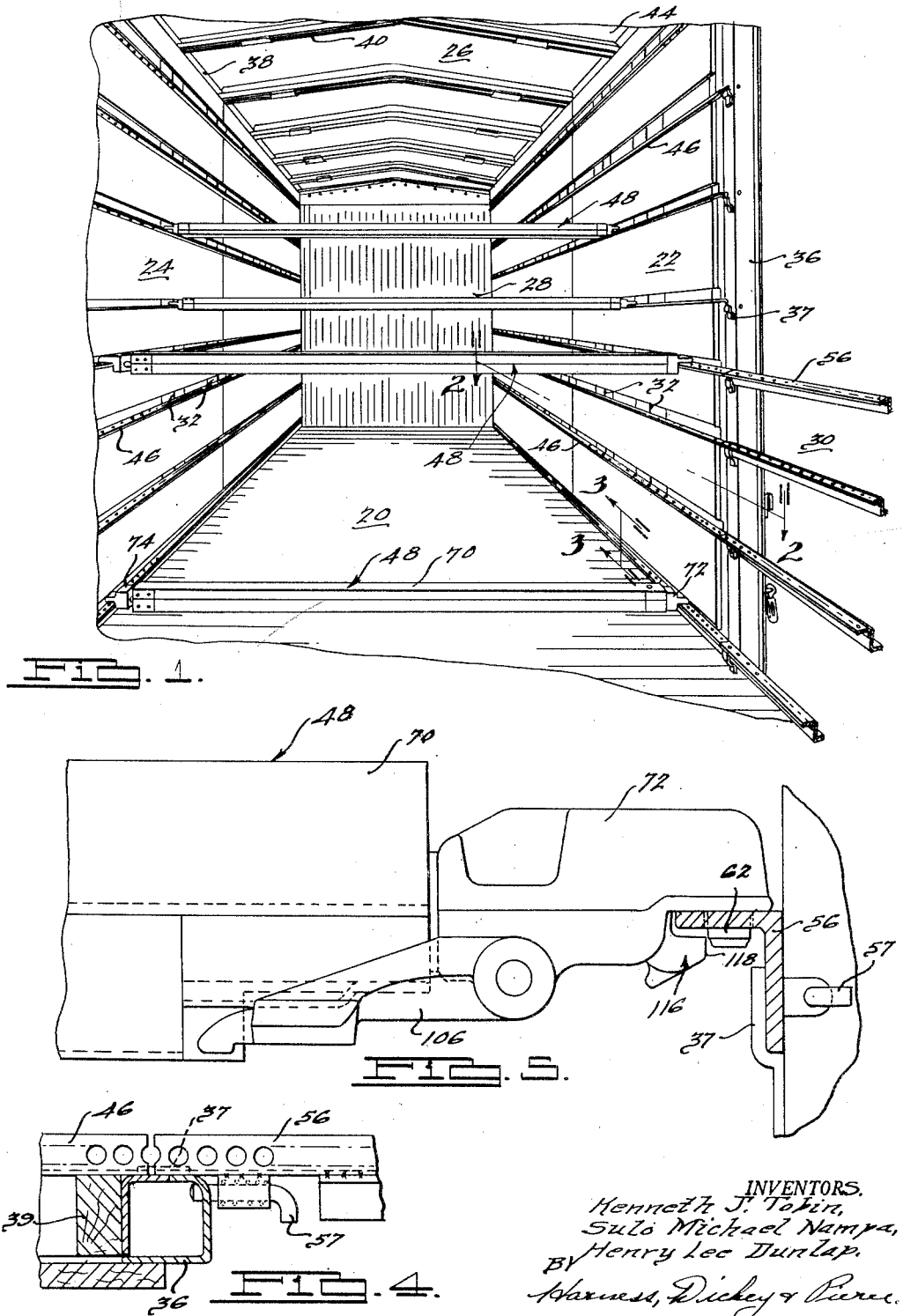

Feb. 14, 1950 S. M. NAMPA ET AL 2,497,683
FREIGHT LOADING APPARATUS
Filed Sept. 25, 1948 6 Sheets-Sheet 3
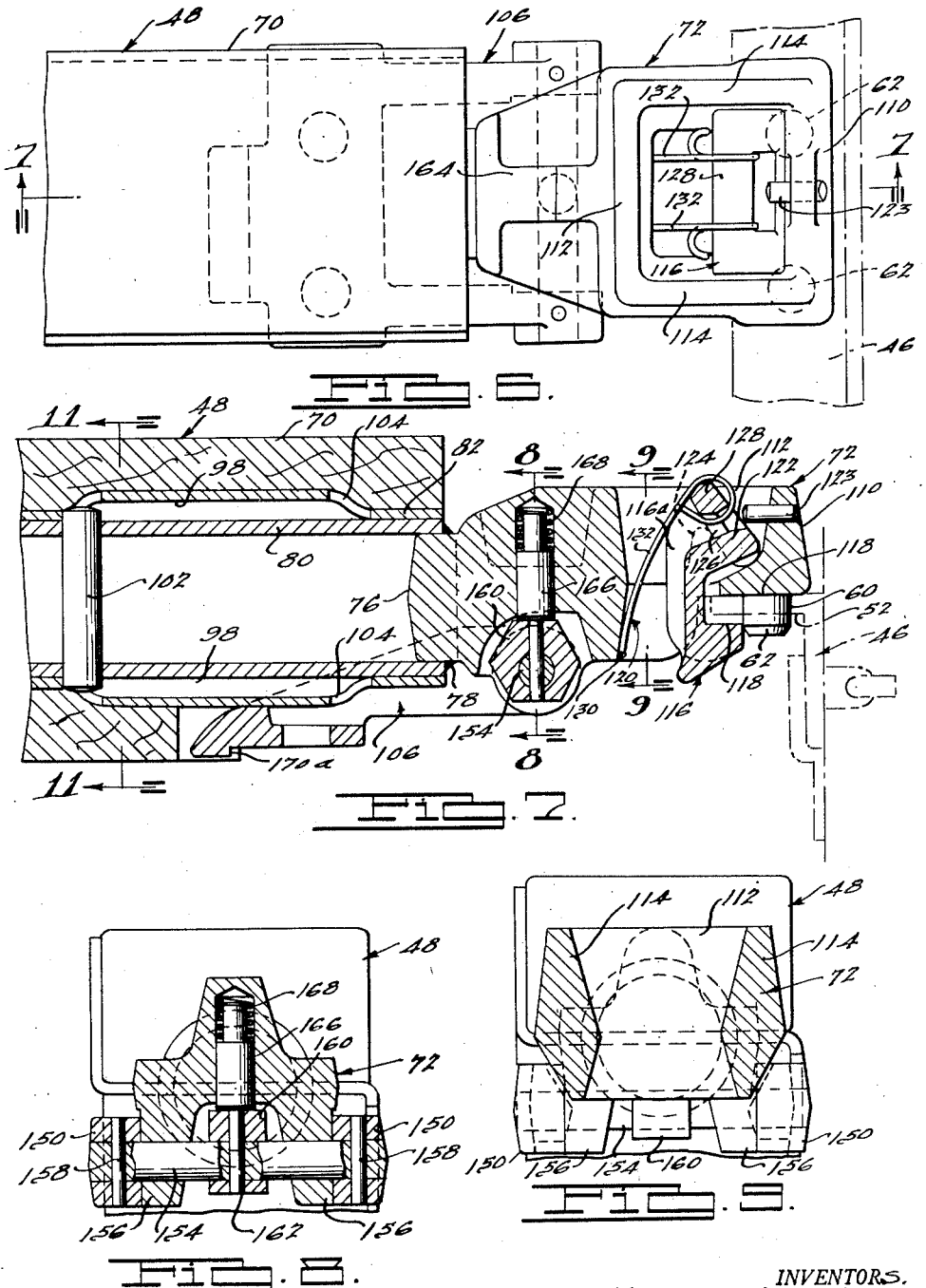
INVENTORS.
Kenneth J. Tobin,
Sulo Michael Nampa,
Henry Lee Dunlap.
BY
Harness, Dickey & Pierce.
ATTORNEYS.

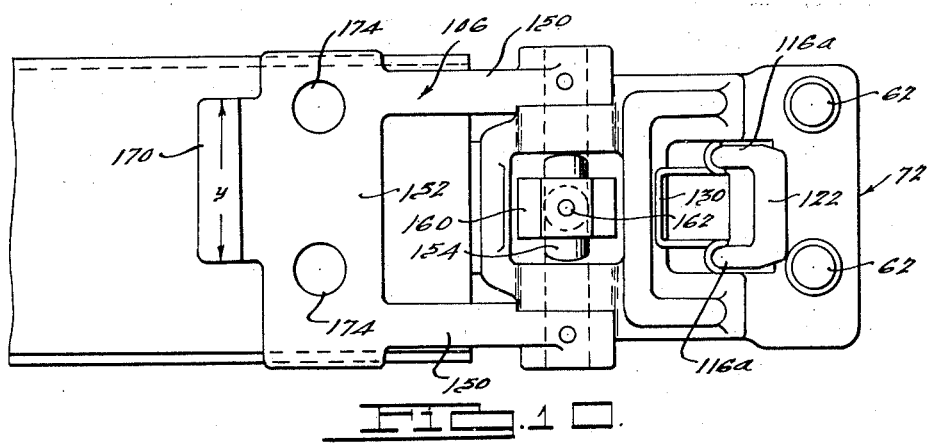
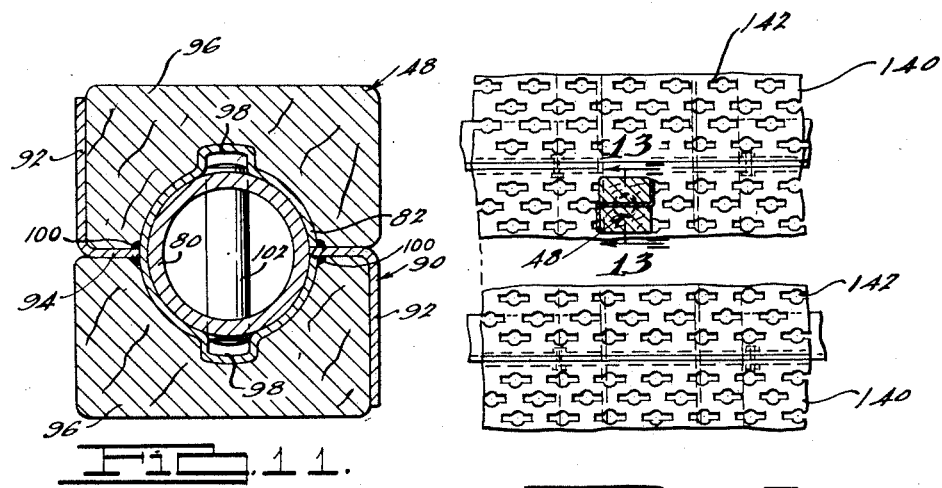
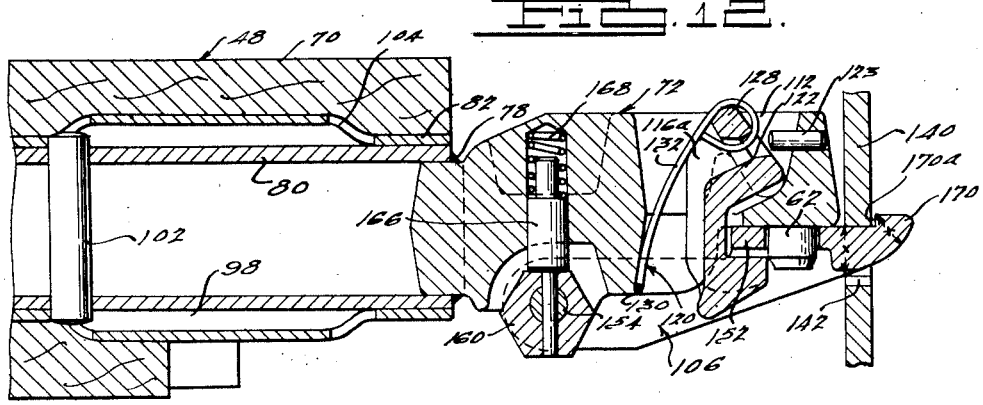

Feb. 14, 1950 — S. M. NAMPA ET AL — 2,497,683
FREIGHT LOADING APPARATUS
Filed Sept. 25, 1948 — 6 Sheets-Sheet 5

INVENTORS.
Kenneth J. Tobin,
Sulo Michael Nampa,
Henry Lee Dunlap.
BY Harness, Dickey & Pierce
ATTORNEYS.

Feb. 14, 1950    S. M. NAMPA ET AL    2,497,683
FREIGHT LOADING APPARATUS
Filed Sept. 25, 1948    6 Sheets-Sheet 6
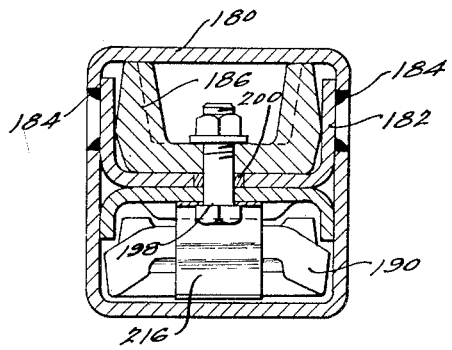
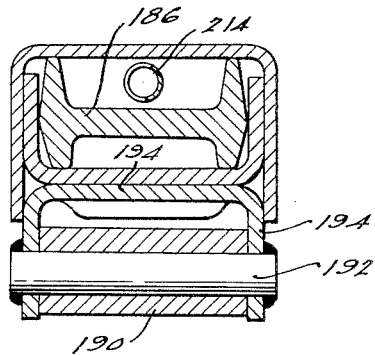
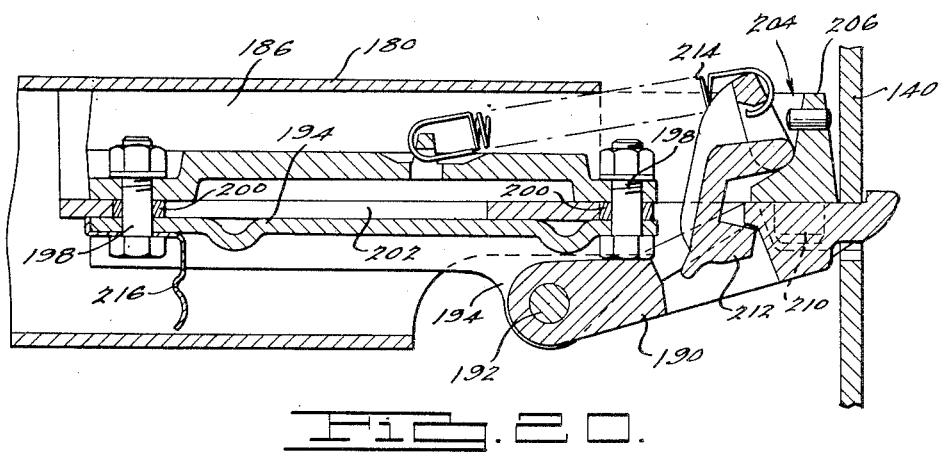
INVENTORS.
Kenneth J. Tobin,
Sulo Michael Nampa,
Henry Lee Dunlap.
BY
Harness, Dickey & Pierce.
ATTORNEYS Patented Feb. 14, 1950

2,497,683

UNITED STATES PATENT OFFICE 2,497,683

FREIGHT LOADING APPARATUS

Sulo Michael Nampa, Detroit, Mich., Kenneth J. Tobin, Chicago, Ill., and Henry Lee Dunlap, Dearborn, Mich., assignors to Evans Products Company, Plymouth, Mich., a corporation of Delaware Application September 25, 1948, Serial No. 51,272

33 Claims. (Cl. 105—369)

The present invention provides improved loading apparatus, frequently referred to in the trade as cross-bars, primarily designed for use as a part of readily adjustable and widely adaptable loading equipment, for holding freight articles of different types in vehicles or storage spaces, such as railway freight cars, to hold (that is, for example, to brace, support, or carry, space, wedge, or to provide shelves, partitions or bins for) a wide variety of packages or parts during shipment.

Freight loading systems of the so-called perforated-wall type are shown in various prior patents and have been used to some extent commercially. There is, however, a distinct and long felt need, for use in such systems, for anti-pull-out or non-accidentally removable freight bracing cross bars to be releasably held or locked in operative positions against all lateral displacements. In addition to the non-laterally-displaceable, anti-pull-out characteristics, such bars should also have the maximum bearing area in the engagement of its perforation-entering means with the sides of the perforations, to thus give high strength connections for carrying both vertical and lateral loads.

Having in mind the foregoing considerations, it is an object of the present invention to provide a freight bracing cross-bar including a combination of desirable features, including a lockable, anti-pull-out arrangement meeting the commercial requirements of this art.

It is a further object to provide in a freight bracing cross-bar such a combination including an anti-pull-out head operable by virtue of a latchable transaxial swinging motion thereof to permit the entry or withdrawal of the portion engaging behind the perforated wall and, more specifically, to provide such latchable, anti-pull-out head operable only by virtue of a combined motion including transaxial swinging and bodily displacement along the length of the bar, and which substantially fills the engaged perforations to prevent all relative lateral displacements.

It is a further object to provide in the aforesaid combinations an improved and otherwise useful telescopic sliding connection to permit adjustment to meet variations in freight car width and to accommodate weaving between the freight car side walls in transit; and to generally improve and simplify the construction and arrangement of freight holding members of the above generally indicated type.

With the above as well as other and more detailed objects in view, which appear in the following description and in the appended claims, preferred but illustrative embodiments of the invention are shown in the accompanying drawings; throughout the several views of which corresponding reference characters are used to designate corresponding parts and in which:

Figure 1 is a perspective view of the interior of a freight car equipped with the present loading apparatus;

Fig. 2 is a broken view in horizontal section, illustrating a preferred structural relation between the belt line side rails and the upright side posts of the car, and taken along the line 2—2 of Fig. 1;

Fig. 3 is a fragmentary view in vertical section, taken along the line 3—3 of Fig. 1, and further illustrating a preferred connection between the side rails and the upright side posts of the car;

Fig. 4 is a fragmentary view in horizontal section, showing certain details of the present improved doorway arrangement;

Fig. 5 is a fragmentary view in side elevation illustrating further details of the doorway arrangement and further showing an end portion of the present improved convertible cross bar;

Fig. 6 is a fragmentary plan view, of the structure shown in Fig. 5;

Fig. 7 is a view in vertical section, taken along the line 7—7 of Fig. 6;

Fig. 8 is a view in vertical section, taken along the line 8—8 of Fig. 7;

Fig. 9 is a view in vertical section, taken along the line 9—9 of Fig. 7;

Fig. 10 is a bottom view of the structure shown in Fig. 6;

Fig. 11 is a view in vertical section, taken along the line 11—11 of Fig. 7;

Fig. 12 is a fragmentary view illustrating one of several alternative freight loading organizations with which the improved convertible cross bar of the present invention may be used;

Fig. 13 is a fragmentary view in vertical section, showing the cross bar of Fig. 5 in condition for use with a wall structure of the type shown in Fig. 12;

Figure 17:
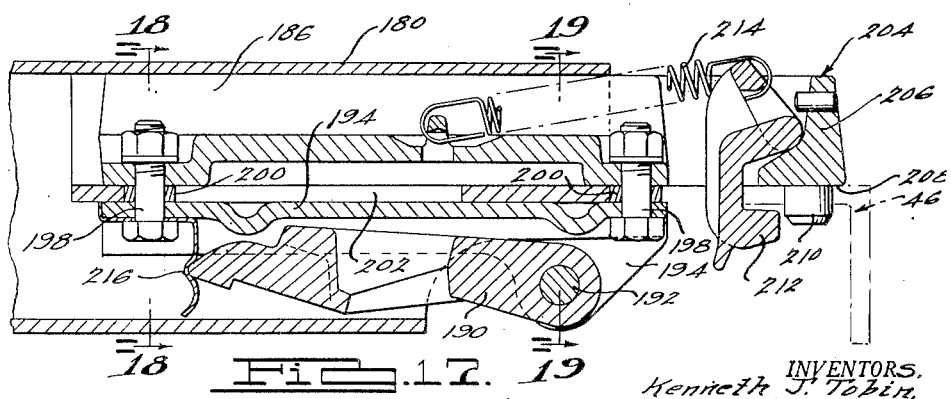
Fig. 17 is a fragmentary view in vertical section, showing a modified construction of convertible cross bar.

Figs. 18 and 19 are, respectively, views in transverse vertical section, taken along the lines 18—18 and 19—19 of Fig. 17; and, Fig. 20 is a view of the bar shown in Fig. 17, but converted for use with and applied to a wall structure of the general type shown in Fig. 12.

The improved loading members claimed in this application are characterized as being adapted for use with the perforated wall type car or other structures having horizontally directed openings as retaining means, and as embodying in combination with associated structural features, the latchable, anti-pull-out characteristic mentioned above. These claimed loading members are disclosed herein in an illustrative sense, as part of a complete freight loading system. Features of the present disclosure, not claimed in this application, are claimed in applicant's copending application, Serial No. 119,942, filed October 6, 1949, as a division hereof.

Referring first to Figures 1 through 5, the illustrated railway freight car is, except in respect to the hereinafter described freight loading elements, of generally conventional construction. Generally speaking, it comprises a usual floor structure 20, side walls 22 and 24, a roof structure 26, and end walls 28, one of which is shown in Fig. 1. Although the wall 24 is illustrated as extending uninterruptedly from and to the end of the car, and the wall 22 is illustrated as being provided with a door opening 30, it will be appreciated that in many instances, both side walls may be provided with door openings.

The structural elements which provide a frame for and support the floor structure 20 form no part of the present invention and are not illustrated herein. The framing structure for the side and end walls of the car primarily comprise the series of longitudinally spaced vertically extending upright intermediate posts 32, corner posts 34, and door posts 36. The side wall posts are shown in Figure 1, it being understood that the intermediate posts for the end wall 28, if used, are concealed behind the usual wooden liner. The roof structure is defined generally by laterally spaced upper rails 38, and interconnecting rafters 40. The side walls and the roof are, of course, sheathed as indicated generally at 42 and 44.

The loading organization now being described is of the belt line type, the basic elements of this loading organization being a series of horizontally disposed, longitudinally extending, vertically spaced, side rails 46, arranged at respectively opposite sides of the car, in vertically aligned relation, and a series of adjustable and removable cross bars 48. Important features of the present invention have to do with the structure of the side rails 46 per se and their combination with the upright side posts, so as to form integrated and strong, but nevertheless light weight, lattice-like side wall structures for the car. More particularly, each latticed side wall structure is made up of integrally interconnected upright posts 32—34—36 (which extend between and are rigidly connected to the floor and roof structures 20—38) and the series of vertically spaced side rails 46. As most clearly appears in Figs. 2 and 3, each individual side rail extends uninterruptedly from corner post to corner post of the corresponding wall except where interrupted by the previously mentioned door opening 30. As pointed out above, in the illustrated embodiment, the door opening 30 is provided at only one side and it will be understood, accordingly, that if a view corresponding to Figure 2 be based upon the wall 24, it will duplicate Figure 2, except that the door opening 30 and the door posts 36 would be lacking. Each individual side rail 46 is rigidly secured to each of its corresponding side, corner, and door posts 32—34—36. As shown, these rigid connections are effected by welding, the weld points being indicated at 50. It will be understood, of course, that if desired, each individual side rail may be made of an initially continuous length of material or a succession of initially separate lengths. The welded joints between the posts and the side rail portions, of course, integrates these side rail portions.

The side rails 46 resist bending both transversely of and vertically of the car. More particularly, in the illustrated form, the side rails 46 are of angle iron form, having the horizontally extending flanges 52, and the vertical flanges 54. As hereinafter described, the door opening 30 may be and preferably is provided with a series of removable side rails 56, which duplicate the rails 46, and are removably connected to the door posts 36.

It will be noticed that the side rails 46 lie immediately inwardly of the car with respect to the posts 32—34—36, and that the flanges 52 face inwardly of the car. In the preferred practice of the invention, intermediate buffer panels 58, are secured to the side walls, in the space between adjacent pairs of side rails 46. Preferably, and as illustrated, the inner surface of these buffer panels project into the car slightly farther than do the flanges 52. Thus, the buffer panels primarily define the inner wall surfaces and these wall surfaces are free of any freight engaging protuberances, which might otherwise injure freight, either during loading or unloading, or in transit.

It will be appreciated that the major freight-imposed loads, to which a freight car is subjected during transit, are horizontal and lengthwise of the car, these loads being imposed primarily under abrupt starting or stopping conditions. In the present structure, these freight imposed loads are uniformly distributed between all of the upright wall posts, this distribution being effected by the rigid connections between these posts and the side rails. These interconnecting and reinforcing side rails, being provided with the vertically and horizontally extending strength portions (in this case, flanges 54 and 52) are able to withstand substantial loads, both in tension and compression and thus strongly resist buckling in directions either transversely or vertically of the car. Independently, of their function as supports for the cross members 48, accordingly, the present side rails 46 materially strengthen the freight car structure as a whole.

Each door post 36 carries a set of clips 37 which removably receive the vertical flanges of the door rails 56, and support them so that the horizontal flanges thereof are aligned with and constitute continuations of the fixed rails 46. Each door rail 56 may be and preferably is provided with a pair of detractable, spring biased locking pins 57, disposed to be received in apertures provided therefor in the posts 36.

As shown, the posts 36 carry wooden nailing strips 39, which may serve as nailing surfaces to permit a conventional grain door to be fixed in place across the doorway. In applying such a door, the ends thereof may, of course, be notched to accommodate those portions of rails 46 which project over the strips 39.

Coming now to the relation between the side rails 46 and the cross bars 48, the rails are provided with separate holding means, which are distributed in uniformly spaced relation along the length of the rails, so that the cross bars can be applied thereto at any desired point along the length of the car. At the same time, the side rails are of a form which enables them to support the cross bars while they are being moved from one adjusted position lengthwise of the car to another position. This feature materially reduces the work of installing the bars, since it is only necessary for the workman to initially position a cross bar on the rail and thereafter shove it to a desired position. As shown, these holding means take the form of punched openings 60, and the corresponding holding means provided on the cross bars take the form of slightly tapered pins 62, each end of each cross bar being preferably provided with a pair of these pins 62, the spacing between which is a multiple of (in this case twice), the spacing between adjacent holes 60. Pins 62 have a working fit in holes 60.

Referring now to Figures 1 and 5 through 14, a preferred construction of convertible cross bar is shown. As aforesaid, claims in this application are directed to the structural features of the bar which adapt it for use with, for example, the perforated wall type of car. Claims to the convertible aspects of the bar and to other features not claimed in this application, are presented in the aforesaid divisional application, Serial No. 119,942, filed October 6, 1949. Each individual cross bar 48 comprises an intermediate freight engaging body portion 70, and a pair of identical end heads 72. In order to enable the bar to accommodate itself to varying car widths (which variations may be due either to original manufacturing variations, or to weaving of the car or the like), and in accordance with the invention broadly claimed in the copending application of the present applicant Nampa, Serial No. 119,942, filed October 6, 1949, as a continuation of the copending but now abandoned application Serial No. 469,719, filed December 21, 1942, the heads 72 are telescopically related to the body 70 of the bar. The telescopic relation may, if desired, be employed in connection with only one of the heads 72, in which event the non-telescopic head may be rigidly secured to the body 70.

As herein illustrated, each head 72 is a forging, one end 76 whereof is rigidly secured, as by welding as indicated at 78, to a cylindrical sleeve 80. Sleeve 80 is slidably received in an outer sleeve 82 which in turn is rigidly connected to the body of the bar. As best seen in Figure 11, the body of the bar is primarily defined by a reinforcing Z-bar 90, having vertically extending flanges 92 and a web 94. Buffer bars 96 are rigidly secured in place on either side of the web 94 and serve to define relatively soft freight-engaging surfaces all the way around the bar.

The outer sleeve 82 may be and preferably is formed from an initially plane sheet of material which is first acted upon to define the axially extending grooves 98, and is thereafter rolled up into cylindrical form and introduced into a notch provided therefor in the web 94. The meeting edges of the sleeve 82 receive the web 94 between them, and the web-to-sleeve connections are completed by welding, as indicated at 100. The sleeve 82 thus defines a cylindrical bore to receive the sleeve 80 and also defines the guide grooves 98. Sleeve 80 carries a drive pin 102 which limits the telescoping movement between the parts. Assembly of the parts is completed by introducing sleeve 80 into sleeve 82 a short distance, and thereafter inserting the drive pin 102 through each of the oppositely disposed but aligned apertures 104 in sleeve 82, this operation being performed, of course, while the hereinafter described adapter arm 106 is swung out of interfering relation.

Viewed in plan, each head 72 defines an opening which is roughly rectangular, having a forward wall 110, a rear wall 112, and laterally spaced side walls 114. The opening defined by these walls receives the hereinafter described spring-biased, locking member 116. The generally flat under side 118 of the forward wall 110, is disposed to directly bear upon the horizontal flange 52 of the corresponding side rail 46, and is provided with the two previously mentioned holding pins 62.

The previously identified latch 116, the nose 118 whereof underlies the flange 52 of the associated rail, is loosely journaled in the head 72, and is biased to a latching position by a spring 120. More particularly, the latch is generally hook-shaped, as viewed in Fig. 13, and comprises the nose 118 and the bearing portion 122. Portions 118 and 122 are interconnected by laterally spaced legs 116a. The bearing portion 122 is loosely journaled in a bearing defined by the inner surface of the front wall 110, and a pair of laterally spaced lugs 124 which project inwardly from the side walls 114. A drive pin 123 blocks removal of the latch from the bearing 110—126.

Laterally spaced arms 126 project upwardly and rearwardly from the ends of the pin portion 122, and are bridged at their outer ends by a connecting portion 128. Spring 120 is illustrated as being formed from a continuous length of spring wire bent upon itself to define a bight 130, which bears against the rear wall 112, and spaced upwardly extending legs 132. These legs 132 extend over, around, and under the connecting portion 128 and the extreme ends thereof are hooked behind the leg portions 116a. From the foregoing, it will be appreciated that the latch 116 may readily be swung in a clockwise direction as viewed in Figure 7, from the holding position shown therein, to a position in which it does not interfere with a movement of the pins 62 into or out of the openings 60. The spring 120 only lightly opposes such a clockwise rotative force applied to the latch 116. On the other hand, the latch positively resists vertical forces applied to the bar 70, tending to lift it away from the rails. This is because of the hook-like character of the latch.

In applying a bar between the rails 46, the latches 116 associated with the heads thereof are, of course, swung to inactive position, and the bar is thereupon laid upon the flanges 52. Because of the free telescopic connection, the heads 72 may readily be moved to a position in which, though the bar is supported by the rails 46, the spacing between the pins 62 at one end of the bar and those at the other end of the bar differs from the lateral spacing between the holes 60 in the rails 46 at opposite sides of the car. Under these conditions, while supported on the rails by its two pins 62, the cross bar 48 may readily be slid along the rails 46 until the desired position of adjustment is reached, after which the telescopic connection may be adjusted slightly, enabling the sets of pins 62 to drop into their respective holes 60. In this use, the provision of two or more pins such as 62 prevents rolling over of the bar while thus supported. Thereafter, the latches 116 may be released, at which time they assume the latching position under the influence of their biasing springs 120.

Alternatively, the bar 48 may be laid upon the rails 46, with the latches 116 in active position, in which event the under sides of the noses 118 rest upon the rails and support the bar during sliding and adjusting movement lengthwise of the car. When the desired position of adjustment is reached, the latches 116 may be retracted or the bar pushed or pulled down, allowing the bar to drop into a selected locked position.

It will be apparent that the general use and the flexibility of the present freight bracing or loading apparatus and its ability to support freight against longitudinal displacement in the car, support freight in tiers or decks, and subdivide it into various compartments are essentially or generally the same as that disclosed in said copending application, Serial No. 119,942, filed October 6, 1949, and hence this common mode of general operation and its advantages need not be repeated here.

In freight loading systems of the general type disclosed, i. e., in which a freight engaging member, such as a cross bar or its retaining means, is held in a selected adjusted position along the car side walls by a positive type of securing means such as interengaging teeth or the engagement of one or more pins or projections in holes or recesses carried by the car side walls, a coarse or relatively wide pitch or spacing of these positive type securing means along the side wall members is desirable to achieve simplicity, lower cost, and in some respects, greater sturdiness. In many and perhaps in most types of loads, only a relatively coarse pitch spacing or fineness of adjustment is required. However, in certain types of freight loads a finer pitch or adjustment is desirable. Hence, there is a need for a pitch splitting arrangement or a means to subdivide the normal pitch spacing when necessary which is of low cost, retains the simplicity and sturdiness of the original system, and which does not introduce any additional movable elements or extra connections or engaging surfaces. Such arrangements are provided by the present invention in which it will be apparent that while the preferred utility of the pitch reducing arrangement is in the adjustments longitudinally of the car yet its use in other adjustments such as vertical, is within the broader purview of this invention as is the utilization of the present principles of pitch splitting in connection with securing means other than pins or projections received in holes and in connection with members other than the present securing means or pins 62 engaged simultaneously.

Coming now to the pitch splitting feature of the present structure, it will be noticed that though the pins 62 are approximately symmetrically arranged with respect to the longitudinal axis of the bar for a substantially symmetrical loading of the bar, but considered as a pair they are non-symmetrical by one-quarter of the spacing between adjacent rail holes 60, the offset being in the same direction at both ends of the bar. Accordingly, considering two particular pairs of holes 60 at opposite sides of the car, the position of the bar body, lengthwise of the car, can be varied one-half of the pitch or spacing of adjacent holes 60 by turning it end for end to thus in effect add or subtract the one-quarter pitch offset. This pitch splitting feature, of course, has the effect of halving the pitch or hole spacing or, stated otherwise, has the effect of increasing, in this instance, doubling the number of adjusted positions which could otherwise be obtained with a given number of holes 60.

Although the pins 62 are in slightly non-symmetrical relation with respect to the axis of the bar, it is to be noted that these pins are relatively widely separated and so have a broad bearing on the rail 46 and give a high degree of end restraint. Accordingly, the various types of loads applied to the bar have little or no tendency to cock it or rock it about its axis. Even though this broad bearing is provided also, it is to be noted that the entire structure of each head 72 lies within the confines of the bar body. Thus, the bar heads never interfere with freight articles which may extend, toward the car wall, beyond the ends of the bar body 70. Injury to freight articles by the heads is thus effectively prevented.

As thus far described, the bars 48 are raised to cooperate with side wall structures of the previously described type wherein the supporting rails are provided with pin receiving apertures. As previously pointed out, an important feature of the herein disclosed invention resides in arranging the bars 48 so that they can readily be converted for use with other types of supporting structures. United States Patents Nos. 2,091,869, granted August 31, 1937, to McCurdy, and 2,030,- 773, granted February 11, 1936, to Thomas, are illustrative of a commonly encountered such alternative type of bar supporting structure.

Figure 14:
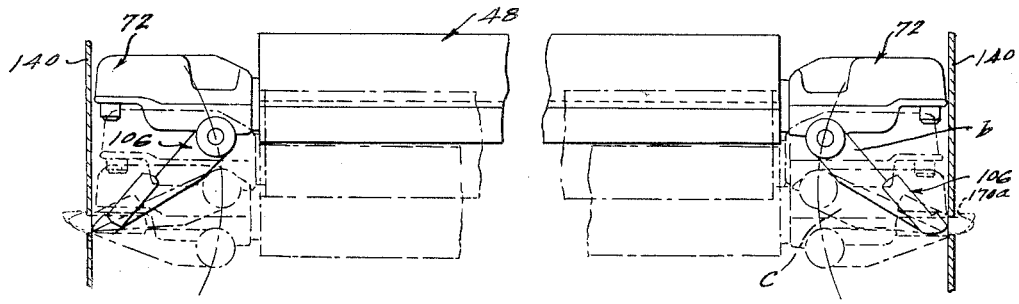
Fig. 14 is a somewhat diagrammatic view illustrating the several successive stages involved in applying the cross bar of Fig. 13 to a wall structure of the general type shown in Fig. 12.

In these arrangements, the car walls are either partly or entirely covered with apertured structures, either fixedly or adjustably positioned, and the apertures in which are adapted to receive retractable pin arrangements carried at the ends of the bar. Figure 12 illustrates fragmentarily a portion of a car wall structure, arranged in accordance with said Thomas patent. In this figure, a metallic lining 140 is provided, which lining is provided with horizontally extending rows of spaced keyhole-like apertures 142, these rows being spaced vertically and the apertures in alternate rows being vertically arranged in staggered relation to give an adjustment between the pitch of one row by moving the bar down or up one row. Such a wall structure is shown in Figures 13 and 14. There is and has been a decided need in the freight loading industry for a, so to speak, universal bar, which can be utilized in cars provided with any of a variety of side supporting structures. This need is well filled by the bar of the present invention.

Further, in the cross bars now usually employed with perforated wall types of cars as exemplified by the above-mentioned McCurdy and Thomas patents, there is no anti-pull-out retaining means. Such anti-pull-out means as have been proposed are believed to have been impractical. Hence these bars now commonly used with such perforated wall cars do pull out permitting the bars to drop during adjustment or in transit due to inaccuracies or to changes in the car widths due to weaving or bulging of the car side walls. Thus there is also a need for a practical and efficient anti-pull-out means which is easy to use and substantially fool-proof. This need applies, not only to, so-called, universal bars but to other types including bars designed or intended for use only in the perforated wall type cars. This need is also met by the present invention and the present arrangement of the retaining member with its anti-pull-out portion on a swinging support (as embodied in adapter 106) may be employed to advantage in bars designed only for perforated wall type cars.

More particularly, and referring now particularly to Figures 7 through 10 and 13 and 14, each of the heads 72 is provided with one of the previously but briefly referred to adapters 106. Each adapter 106 is, as viewed in Figure 10, of general U-shaped form, having laterally spaced legs 150 and a connecting bight or bridge 152, the thickness of which is approximately that of the flange 52 of the previously described rails 46. The outer ends of the legs 150 are apertured to receive a pivot pin 154, which is rotatably journaled in bearing openings provided therefor in bosses 156 which project downwardly from the previously identified rear wall 112. Drive pins 158 hold the shaft 154 and the adapter 106 in assembled relation to each other and to the bosses 156.

In accordance with the present invention, means are provided to releasably, but fairly positively, hold the adapter in the retracted out of the way position of Figure 7, and to lightly bias it to the preliminary or cocked positions indicated at b and c in Figure 14, and the active position shown in Figure 13. In the illustrated embodiment, this detent holding relation is achieved by providing the shaft 154 with a hexagonal cam 160, held in place by a drive pin 162. Only four sides of the cam 160 are active, the six sided relation being preferred to enable the same cam to be used in connection with heads at either end of the bar.

A reinforcing rib 164 extends rearwardly from the rear wall 112 and is bored from the under side to receive a holding pin 166 and a biasing spring 168. In the position shown in Figure 7 the pin 166, of course, bears upon the highest one of the flats on cam 160 and yieldingly holds the adapter 106 in the illustrated position. Similarly, the pin 166 bears in succession against the next two flats to yieldingly hold the adapter 106 in, respectively, the positions marked b and c in Figure 14. Finally, the pin 166 bears against the flat opposite to the one shown in Figure 7, to yieldingly hold the adapter in the active position of Figure 13.

In the active position of Figure 13, the engaging or retaining portion or the offset nose 170 of the adapter extends through a corresponding opening 142 in the wall panel 140, and a shoulder portion 170a of the nose lies behind and in holding or anti-pull-out relation to the wall panel 140. In this position, also, the pins 62 on head 72 project (with a working fit) through openings 174 provided therefor in the adapter bridge 152, and the upper surface of the adapter bridge bears directly against the previously identified flat under side 118 of the front wall 110 of the head 72. The openings 174 are slightly elongated to permit entry of the pins 62 during the swinging movement of adapter 106. With this relation, it will be appreciated that vertical loads applied to the bar are transmitted directly from the adapter bridge and head engaging surfaces and are not required to be transmitted, in any large part, through the pivotal connection between the head and the adapter. Similarly, loads applied to the bar longitudinally of the freight car, are transmitted directly from the pins 62 to the adapter 106, thereby in a large part, if not entirely, eliminating these loads from the pivotal connection between the adapter and the head.

The nose 170 is offset laterally from the bar axis to provide the aforesaid pitch-splitting feature. As before, the offset is a sub-multiple of the spacing between two adjacent holes 142 in vertically spaced and adjacent rows. This arrangement is preferred here in view of the pitch reduction permitted by lowering or raising the bar one row in the alternately offset rows of these perforated wall cars.

In applying a bar 48 to a wall structure of the type shown in Figure 12, the action is substantially as illustrated in Figure 14. In this figure, in the uppermost position, the heads 72 are telescoped outwardly to a point where they are immediately adjacent, or may in fact engage, the wall panels 140, and the adapters 106 are swung downwardly to points where the noses 170 are just ready to enter a corresponding pair of apertures 142. If now the bar is lowered slightly the adapters may be swung out, advancing the noses 170 through the apertures 142 and bringing the shoulders 170a behind and in holding relation to the panel 140.

While the adapters may be arranged to swing into locking or engaging position as the bar is raised, yet the presently disclosed arrangement is preferred since in use it is easier to lower the bar permitting the adapters to swing into engaging position.

Thereafter the bar may be lowered into place, during which movement the adapters swing about their pivot pins 154. During the course of this movement, these pins 154, of course, follow an arcuate path, such action being permitted by the telescopic connection or connections between the heads 72. This arcuate path is shown in somewhat exaggerated fashion in Figure 14, position c being approximately at the inner limits of the telescopic adjusting movement.

It will be noticed that when the bar is in place, the noses 170 substantially entirely fill the openings 142 leaving only the small semi-circular enlargements at the tops and bottoms. If desired, of course, the noses 170 may be provided with ridges to fill these semi-circular spaces.

The full use of the entire horizontal and vertical surfaces of the openings 142 materially increases the load bearing capacity of the panels 140, as will be understood. This full use is permitted by the configuration of the noses 170, it being noticed that the dimensions indicated at X in Figure 13 are just slightly less than the vertical heights of the apertures 142. The width of each nose 170 is, of course, just slightly less than the length of each opening 142. The just-mentioned differences need be, of course, only large enough to allow for reasonable manufacturing tolerances. Similar considerations make it preferable to allow for a small gap between the shoulder 170a and the panel 140, when the parts occupy the position of Figure 13. Under these conditions there is also a comparable gap between the outer end of head 72 and panel 140.

It will be appreciated from the foregoing that the connections between the adapters 106 and the side panels 140 are such that the bars, after being installed as aforesaid, cannot be removed except by a reversal of the action described with respect to Figure 14. The noses 170 by lying behind the panels 140, positively prevent any tendency of the wall spacing to change in transit, due to weaving or other causes, causing the adapter to pull out of the holes, and drop the bars. This is a difficulty frequently encountered with conventional cross bars.

Moreover, the aforesaid connections between the adapters 106 and the openings 142 establishes what will be recognized as an end-restraint connection between the bars 48 and the side wall structure. This end restraint connection, of course, materially increases the beam loading capacity of the organization, since beam loads, instead of being borne entirely by the bar structure, are distributed to the wall structures. This same advantage of end-restraint is, of course, achieved with the bar when used as shown in Figure 5, and is provided by the closely fitting pins 62 and apertures 60.

Figures 15, 16:
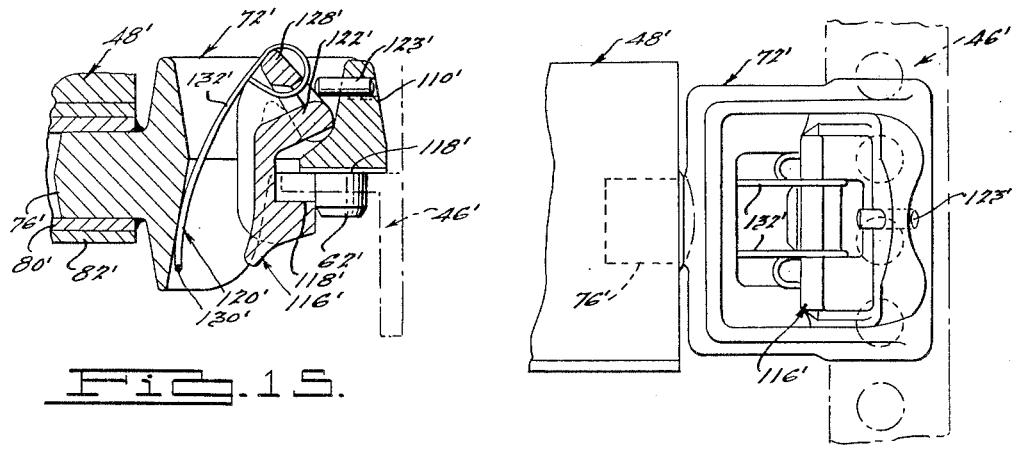
Fig. 15 is a fragmentary view in longitudinal vertical section of a simplified form of cross bar.
Fig. 16 is a fragmentary plan view of the bar of Fig. 15.

The simplified embodiment of Figures 15–16 is like that of Figure 7 except that it does not include the adapter 106 and so is not convertible. Similar reference characters indicate corresponding parts and it is thought that no further description of Figures 15–16 is needed.

Figures 17 through 19 illustrate a modified bar construction, arranged for use with side rails such as 46, and Figure 20 shows the same bar converted for use with a wall panel structure such as is shown in Figure 12.

Referring particularly to Figures 17, 18, and 19, the body 180 of the bar is of generally boxlike form. Near each end, the body 180 is provided with an insert in the form of a channel member 182, the flanges of which are welded to the bar body as indicated at 184. In this instance, the head comprises an elongated forging, the rear portion 186 of which is of channel shape and is slidably received in and guided by the previously mentioned channel 182.

The adapter 190 is pivotally connected, by a pin 192, to a generally downwardly presenting channel-shaped member 194, which is slidably received in the bar body, and the web of which lies in surface engagement with the web of the fixed channel 182. Bolts 198 interconnect the forging 186 and the lower member 194. Washers 200 are carried by these bolts, and are approximately the thickness of the web of the channel 182. One of these washers and its corresponding bolt ride in a longitudinal slot 202 provided in the web of the channel 182. The other washer, in the position shown in Figure 17, abuts the end of the web of the member 182. With this relation, it will be appreciated that telescopic movement between the head structure 204 and the bar body 180 is permitted. As before, this sort of a telescopic connection may be and preferably is utilized at both ends of the bar. If it is to be utilized at only one end, the head structure may be locked in place relative to the channel 182.

The outer end of the head 204 defines a wall 206, having a flat under side 208, and pins 210, which cooperates with an associated side rail 46 in the previously described manner. Additionally, the head 204 may be provided with a latch 212, biased to active position by a tension spring 214.

In further accordance with the present invention, the adapter 190, normally held in the retracted position by a holding spring 216, may be swung to the position of Figure 20 for cooperation in the previously described manner with wall panel 140. In this instance, also, when in the active position, loads are transmitted directly between the adapter 190 and the nose 206 of the head 204, thus largely relieving the pivot 192 of such loads.

Although only several embodiments are disclosed in detail in this specification taken with the drawings, it is to be understood that various modifications and other forms of the invention may be employed within the scope of the appended claims.

What is claimed is:

1. As an article of manufacture, an elongated freight bracing bar to extend across, between, and be secured in selected perforations in, opposite upright side surfaces of a chamber such as a freight car, said bar having adjacent each end thereof a perforation-entering and normally anti-pull-out member which, in its engaged and operative position, has a laterally extending portion interengaging behind a said surface, at least one of said members being mounted on said bar to at least swing relative to the bar in a plane substantially parallel and adjacent to the longitudinal axis of the bar to permit insertion and removal of both said members, and a movable latch to selectively secure said swingable member to said bar to hold said swingable member in its operative position.

2. The structure of claim 1 in which each said perforation-entering member is of a size and proportion to fill said perforations to such extent as to substantially prevent lateral and vertical displacements relative thereto.

3. The structure of claim 1 in which said swingable member is so mounted that in its said operative position it has a portion engaging an adjacent end portion of the bar, said engagement cooperating in providing a limit to said swinging movement.

4. The organization of claim 1 in which, when said bar is in its said operative position, said swinging is in a substantially vertical plane and said bar includes co-engageable surfaces to limit upward swinging of said member beyond its said operative position.

5. The organization of claim 1 in which said bar includes intermediate its length a slidable connection to permit relative axial motion between said perforation-entering members to cooperate with said swinging motion and provide a compound movement to permit said insertion and removal.

6. The organization of claim 1 in which, in said operative position of the bar, said swinging is in a substantially vertical plane, and in which each said laterally extending portion is integral with its perforation-entering member and is upwardly directed when the bar is in its said operative position.

7. The organization of claim 1 in which said bar includes means intermediate its ends to permit at least axial relative motion between the said members and in which each member has substantially parallel flat sides to substantially fill and engage the perforation boundary defining walls and in which each laterally extending portion is upwardly directed and provides a substantially flat axially inwardly presented and laterally extending surface for said interengaging and forming a corner with one of said substantially parallel flat sides of said corresponding member to provide said anti-pull-out interengagement by an engaged area adjacent to the edge of the engaged perforation.

8. As an article of manufacture, an elongated freight bracing bar to be secured in selected positions in perforations in opposite upright wall surfaces of a chamber such as a freight car, said bar having perforation-entering heads adjacent its ends, each of said heads including a perforation-entering portion which, in engaged position, is upwardly directed and interlocks behind a said surface to prevent accidental removal of the corresponding end of the bar, at least one of said heads being mounted for movement having at least a component of swinging motion in a plane substantially parallel and adjacent to the longitudinal axis of said bar to permit inspection and removal thereof, and a latch movably mounted on said bar to selectively engage said swingable head to secure it in operative position.

9. The organization of claim 8 in which said bar includes means to permit relative motion between said heads at least axially of said bar.

10. As an article of manufacture, an elongated freight holding bar to be secured in substantially horizontally directed perforations on opposite sides of a chamber such as a freight car, said bar having a perforation-entering and anti-pull-out hook-shaped member mounted at each end thereof, at least one of said hook-shaped members being mounted on said bar for at least a swinging movement in a plane substantially parallel and adjacent to the longitudinal axis of said bar, said bar including slidably related portions to permit relative motion between said end members having a component along the length of said bar, said combined motions cooperating to permit mounting of said bar in its said operative position and its removal therefrom, and a latch member swingably mounted on said bar to selectively engage said swingable head to retain it in its operative position.

11. The structure of claim 10 in which said plane of swinging movement is substantially vertical in the said operaive position of the bar.

12. The structure of claim 10 in which when the bar is in its said operative position, each said hook-shaped member comprises an integral, upwardly directed portion at its outer end shaped to extend through and engage behind said perforations above and adjacent thereto.

13. The structure of claim 10 wherein said swingable member is slidably mounted with respect to the bar to give said lengthwise component, and said latch member prevents only said swinging motion of said swingable hook-shaped member from its said operative position to thus prevent accidental removal of said bar but permitting said axial motion to accommodate weaving of said freight car side walls in transit.

14. The combination of claim 10 in which each said hook-shaped member also includes a motion limiting shoulder surface to engage the inner surfaces of said chamber sides when said bar is in its said operative position to cooperate with the anti-pull-out function of each said hook-shaped member to limit axial motion of said members in either direction relative to said chamber sides.

15. The organization of claim 10 in which said bar has an axially extending female, guide forming socket, and said swingable hook-shaped member is mounted on an axially extending male element portion non-rotatably mounted in said guide forming socket for said motion along the length of the bar.

16. The combination of claim 10 in which said bar has adjacent at least one end thereof an axially extending female, guide forming socket and in which at least said one of said hook-shaped members includes and is pivoted for its said swinging motion on an element having an axially extending male portion non-rotatably mounted in said socket for said motion along the length of the bar.

17. As an article of manufacture, an elongated freight bracing bar to extend across, between, and be secured in, selected substantially horizontally directed perforations in upright walls as in a freight car, said bar having a male, perforation-entering member movably mounted at each end thereof to have at least a component of swinging motion in a plane substantially parallel and adjacent to the longitudinal axis of the bar, each said male member having a laterally extending and perforation-entering portion interengaging behind said upright perforated walls in the operative position of the bar, and said bar having slidably related portions intermediate its ends to permit relative motion between said male members along the length of the bar, and latches movably mounted on the bar adjacent each end thereof to selectively engage said perforation-entering members to prevent said component of swing when they are in operative positions.

18. The organization of claim 17 in which said male members and their swing-permitting mountings are identical at each end of the bar.

19. The organization of claim 17 in which said male members and their laterally extending portions are shaped and arranged to cooperate with the combined motions of said swinging and said motion along the length of the bar to permit the simultaneous insertion or withdrawal of said male members at the two ends of the bar.

20. As an article of manufacture, a freight bracing cross bar for use in a freight car having bar securing means such as vertical steel plate linings carried by the car side walls and having perforations therethrough, said bar being adapted to extend horizontally across the car and to be removably secured in and between selected opposite perforations; said bar having an elongated body portion having a perforation-entering, male head at each end thereof; at least one of said heads being mounted to swing relative to said body portion in a plane which in operative position of said bar is substantially vertical and substantially parallel and adjacent to the longitudinal axis of said bar, between an operative perforation-entering position and a lower hang-down insertion position; stop means to prevent upward swinging of said swingable head past its operative position; each male head further comprising an accidental pull-out preventing, perforation-entering outer end portion which is upwardly extending in the operative engaged position of the bar and has an inner upwardly extending shoulder surface to substantially engage said wall linings on their outer faces above the engaged perforations to prevent withdrawal of said perforation-entering outer end portion without at least swinging motion of the corresponding head relative to said lining; and a manually operable latch adjacent the corresponding end of the bar and acting between said swingable head and said body portion to selectively prevent downward swinging motion of said swingably mounted head from its operative position.

21. The organization of claim 19 in which said latch is swingably mounted on said body portion and acts directly between said swingable head and body portion.

22. The organization of claim 19 wherein said bar includes slidably related portions intermediate its ends to permit relative movement of heads lengthwise of the bar.

23. As an article of manufacture, a freight bracing cross bar for use in a freight car having bar securing means such as vertical steel plate linings carried by the car side walls and having perforations therethrough, said bar being adapted to extend horizontally across the car and to be removably secured in and between selected opposite perforations; said bar having an elongated body portion having at at least one end thereof an axially extending and open-ended recess of non-circular internal cross section defined at least in part by guide-forming metal elements which include laterally spaced guide surfaces; a perforation-engaging head at each end of said bar, at least one of said heads including a shank portion of non-circular cross section slidably mounted in said recess in non-rotative relation but for movement having an axial component relative to such recess, for axial adjustment to fit different freight car widths and to accommodate weaving motion between the freight car side walls under loads in transit, said shank portion being received between the corresponding said guide surfaces to prevent lateral motions of the shank therebetween; said shank and recess having co-engageable surfaces to prevent accidental withdrawal of said shank from said recess; said one head further comprising an accidental pull-out preventing perforation-entering portion, which is connected to the shank portion, to swing, relative to said body portion, in a plane substantially parallel and adjacent to the longitudinal axis of the bar, between an operative perforation-entering position and a lower hang-down insertion position; stop means to prevent upward swinging of said perforation-entering portion past its operative position; said perforation-entering portion in operative engaged position having an upwardly extending outer end portion which has an inner upwardly extending shoulder surface to substantially engage said wall linings on their outer faces above the engaged perforations to prevent withdrawal of said perforation-entering portion without at least swinging motion relative to said lining.

24. As an article of manufacture, a freight bracing cross bar for use in a freight car having bar securing means such as vertical steel plate linings carried by the car side walls and having perforations therethrough, said bar being adapted to extend horizontally across the car and to be removably secured in and between selected opposite perforations; said bar having an elongated body portion having at at least one end thereof an axially extending and open-ended recess of non-circular internal cross section defined at least in part by guide-forming metal elements which include laterally spaced guide surfaces; a perforation-engaging head at each end of said bar, at least one of said heads including a shank portion of non-circular cross section slidably mounted in said recess in non-rotative relation but for movement having an axial component relative to such recess, for axial adjustment to fit different freight car widths and to accommodate weaving motion between the freight car side walls under loads in transit, said shank portion being received between the corresponding said guide surfaces to prevent lateral motions of the shank therebetween; said shank and recess having co-engageable surfaces to prevent accidental withdrawal of said shank from said recess; said one head further comprising an accidental pull-out preventing perforation-entering portion, which is connected to the shank portion, to swing, relative to said body portion, in a plane substantially parallel and adjacent to the longitudinal axis of the bar, between an operative perforation-entering position and a lower hang-down insertion position; stop means to prevent upward swinging of said perforation-entering portion past its operative position; said perforation-entering portion in operative engaged position having an upwardly extending outer end portion which has an inner upwardly extending shoulder surface to substantially engage said wall linings on their outer faces above the engaged perforations to prevent withdrawal of said perforation-entering portion without at least swinging motion relative to said lining; and a manually operable latch adjacent said end of said bar acting between said swingable portion and said body portion to selectively prevent downward swinging motion of said perforation-entering portion from its operative position.

25. The structure of claim 24 wherein said perforation-engaging portion is separate from and is pivotally connected to said shank portion for said swinging movement thereof.

26. The structure of claim 24 wherein said shank portion and recess cooperate to prevent any substantial transaxial movement of said shank portion in said recess, and said perforation-engaging portion is a separate member pivotally connected to said shank portion for said swinging movement thereof.

27. The structure of claim 24 in which said perforation-engaging portion has only one finger located centrally of said bar and to engage in only one perforation at a time.

28. The structure of claim 24 in which both ends of said body portion are provided with identical said recesses and heads.

29. As an article of manufacture, a freight bracing cross bar for use in a freight car having bar securing means such as vertical steel plate linings carried by the car side walls and having perforations therethrough; said bar being adapted to extend horizontally across the car and to be removably secured in and between selected opposite perforations; said bar having an elongated body portion comprising a structural section extending from end to end thereof; a head at each end of said bar, at least one whereof is telescopically connected to said intermediate body portion for limited axial movement with respect thereto to fit different freight car widths and to accommodate weaving motion between the freight car side walls under loads in transit; said body portion having at at least one end thereof an axially extending and open-ended recess of non-circular internal cross section received in a corresponding recess in said structural section and defined at least in part by laterally spaced guide-forming metal elements rigidly secured to said structural section; said one head comprising axially spaced shank and finger portions, said shank portion being of non-circular cross section slidably mounted between said laterally spaced metal elements for cooperation therewith to provide said nonrotative mounting while permitting said axial movement; at least said finger portion of said one head being swingable relative to said body portion in a plane substantially parallel and adjacent to the longitudinal axis of the bar, between an operative position projecting outwardly beyond the corresponding end of the intermediate body portion and substantially parallel to the axis of the bar and a hang-down insertion position inclined to and with its outer end below the bar axis; said shank and recess having coengageable surfaces to prevent accidental withdrawal of said shank from said recess; stop means to prevent upward swinging of said finger portion past its operative position; said finger portions, in operative engaged position, having upwardly extending outer end portions with inner upwardly extending shoulder surfaces to substantially engage said wall linings on their outer faces above engaged ones of said perforations to prevent withdrawal of said finger portions without at least swinging motion relative to said lining; and a manually operable, swingable latch adjacent said one end of said bar engageable with the said finger portion to selectively prevent said downward swinging motion of said finger portion from its operative position.

30. As an article of manufacture, a freight bracing cross bar for use in a freight car having bar securing means such as vertical steel plate linings carried by the car side walls and having perforations therethrough, said bar being adapted to extend horizontally across the car and to be removably secured in and between selected opposite perforations; said bar having a straight, elongated, intermediate main body portion comprising a structural section extending from end to end thereof and having an intermediate web; said intermediate body portion having at each end thereof identical axially extending and open-ended recesses of non-circular internal cross section received in corresponding recesses in said web and defined in part at least by guide-forming metal elements which include laterally spaced guide surfaces rigidly secured to said web at its recessed surfaces; a head at each end of said bar, each said head including a shank portion of non-circular cross section slidably mounted in the corresponding recess in non-rotative relation but for movement having an axial component relative to such recess, for axial adjustment to fit different freight car widths and to accommodate weaving motion between the freight car side walls under loads in transit, each said shank portion being received between the corresponding said guide surfaces to prevent lateral motions of the shank therebetween; said shanks and recesses having coengageable surfaces to prevent accidental withdrawal of said shanks from their said recesses; said heads further comprising pull-out preventing, perforation-engaging finger portions which project axially outwardly from the ends of the intermediate body portion and which are connected to the corresponding shank portions to swing, relative to said intermediate body portion, in a plane substantially parallel and adjacent to the longitudinal axis of the bar, between operative positions projecting outwardly beyond the ends of the intermediate body portion and substantially parallel to the axis of the bar and hang-down, insertion positions inclined to and with their outer ends below the bar axis; stop means to prevent upward swinging of said finger portions past their operative positions; said finger portions, in operative engaged position, having upwardly extending outer end portions which are upwardly curved at their axial outer ends and inner upwardly extending shoulder surfaces to substantially engage said wall linings on their outer faces above the engaged perforations to prevent withdrawal of said finger portions; said finger portions also having shoulders to substantially engage the said wall linings on their inner faces below the engaged perforations to limit motions of said finger portions toward the corresponding said freight car walls; said formation of said finger portions and the interfitting relation thereof to said perforations permitting said bar to be engaged and disengaged from said wall perforations only by a combined swinging and axial sliding motion of the finger portion at at least one end of the bar relative to its intermediate body portion; and manually operable, swingable latches adjacent the ends of said bar to selectively prevent downward swinging motions of said finger portions from their operative positions.

31. The structure of claim 30 in which each said recess-defining metal elements at each end of the bar are formed by a cylindrical tube having its non-circular portion formed by at least one axially extending radially struck-out groove and said shank portion comprises a cylindrical member having its non-circular portion provided by at least one radially projecting end of a transverse removable pin therethrough.

32. As an article of manufacture, a freight bracing cross bar for use in a freight car having bar securing means such as vertical steel plate linings carried by the car side walls and having horizontally elongated perforations therethrough, said bar being adapted to extend horizontally across the car and to be removably secured in and between selected opposite perforations; said bar having a straight, elongated, intermediate main body portion of substantially square and uniform cross section and having outermost, flat, freight-cushioning wood surfaces of substantial width and extending substantially from end to end on all four sides; said intermediate portion comprising a uniform structural steel section extending from end to end thereof and having an intermediate web which is substantially in the neutral axis of said body portion and which is horizontal in normal operative position and also having integral, equal, and parallel flanges thereon extending from opposite sides of said web upwardly and downwardly substantially from top to bottom of said bar; said body portion further comprising a rectangular cross section wood buffer and strength member lying alongside of and engaging each corresponding flange and engaging and secured to each side of said web from end to end to form said square cross section and said freight-cushioning surfaces, and axially spaced means extending through said web to secure said wood members together; said intermediate body portion having at each end thereof identical axially extending and open-ended recesses of non-circular internal cross section received in corresponding recesses in said web and said adjacent wood members and defined at least in part by guide-forming metal elements which include laterally spaced guide surfaces rigidly secured to said web at its recessed surfaces; a head at each end of said bar, each said head including a shank portion of non-circular cross section slidably mounted in the corresponding recess in non-rotative relation but for movement having an axial component relative to such recess, for axial adjustment to fit different freight car widths and to accommodate weaving motion between the freight car side walls under loads in transit, each said shank portion being received between the corresponding said guide surfaces to prevent lateral motions of the shank therebetween; said shanks and recesses having co-engageable surfaces to prevent accidental withdrawal of said shanks from their said recesses; said heads further comprising pull-out preventing, perforation-engaging finger portions which project axially outwardly from the ends of the intermediate body portion and which are connected to the corresponding shank portions to swing, relative to said intermediate body portion, in a plane substantially parallel and adjacent to the longitudinal axis of the bar, between operative positions projecting outwardly beyond the ends of the intermediate body portion and substantially parallel to and on the neutral axis of the bar and hang-down, insertion positions inclined to and with their outer ends below the bar axis; said finger portions having cross sections substantially like that of said perforations to fill them for maximum strength and to thus substantially prevent relative lateral movement therebetween, and, in operative engaged position, having upwardly extending outer end portions which are upwardly curved at their axial outer ends and inner upwardly extending shoulder surfaces to substantially engage said wall linings on their outer faces immediately adjacent and above the engaged perforations to prevent withdrawal of said finger portions; said finger portions also having shoulders to substantially engage the said wall linings on their inner faces immediately adjacent and below the engaged perforations to limit motions of said finger portions toward the corresponding said freight car walls; said formation of said finger portions and the interfitting relation thereof to said perforations permitting said bar to be engaged and disengaged from said wall perforations only by a combined swinging and axial sliding motion of the finger portion at at least one end of the bar relative to its intermediate body portion; said bar including co-engageable stop surfaces for each head and including at least one upwardly presented surface which moves with the finger portion of such head, engagement between said surfaces limiting upward swinging motion of said finger portion beyond its said operative position; and manually operable, swingable latches adjacent the ends of said bar and having latch surfaces engageable under surfaces integral with the corresponding said finger portions to prevent downward swinging motions of said finger portions from their operative positions and being movable out of said engagement to permit said downward movements and removal of the bar for adjustment.

33. The structure of claim 20 in which said elongated body portion comprises a rectangular tubular metal section uniform from end to end thereof and in which said heads are mounted in the open ends of said tubular section.

SULO MICHAEL NAMPA.
KENNETH J. TOBIN.
HENRY LEE DUNLAP.

REFERENCES CITED

The following references are of record in the file of this patent:

UNITED STATES PATENTS

| Number | Name | Date |
| --- | --- | --- |
| Re. 20,860 | Thomas | Sept. 13, 1938 |
| 2,056,704 | Anderson | Oct. 6, 1936 |
| 2,091,869 | McCurdy | Aug. 31, 1937 |
| 2,268,394 | Hebert | Dec. 30, 1941 |
| 2,440,437 | Fahland | Apr. 27, 1948 |
| 2,476,362 | Fahland | July 19, 1949 |

Disclaimer 2,497,683.—*Sulo Michael Nampa*, Detroit, Mich., *Kenneth J. Tobin*, Chicago, Ill., and *Henry Lee Dunlap*, Dearborn, Mich. FREIGHT LOADING APPARATUS. Patent dated Feb. 14, 1950. Disclaimer filed Oct. 14, 1950, by the assignee, *Evans Products Company*.

Hereby enters this disclaimer to claims 1, 2, 3, 4, 6, 8, 20, 21, and 33 of said patent.

[*Official Gazette December 5, 1950.*]

Certificate of Correction

February 14, 1950

Patent No. 2,497,683

SULO MICHAEL NAMPA ET AL.

It is hereby certified that error appears in the printed specification of the above numbered patent requiring correction as follows:

Column 14, lines 64 and 68, for the claim reference numeral "19" read *20*; and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*